April 18, 1967  J. SHILLING, JR  3,314,080
HUMIDIFYING SYSTEM
Filed Aug. 18, 1964

INVENTOR.
JOHN SHILLING, JR.,

By His Attorneys
HARRIS, KIECH, RUSSELL & KERN

United States Patent Office 3,314,080
Patented Apr. 18, 1967

3,314,080
HUMIDIFYING SYSTEM
John Shilling, Jr., 16126 Spinning Ave.,
Gardena, Calif. 90247
Filed Aug. 18, 1964, Ser. No. 390,325
15 Claims. (Cl. 4—68)

This invention relates to a humidifying system and more particularly to a humidifier especially suitable for use in domestic dwellings and the like.

The control of atmospheric conditions within dwelling enclosures to maintain a comfortable humidity has been achieved in its familiar form by placement of a humidifier in or on the plenum chamber of a hot air furnace. All humidifiers, regardless of the principles of operation, whether it be direct or indirect humidification, are adversely affected by the mineral content of the feed water. In the more common or indirect humidification system, or air-washer humidifier as it is commonly known, all of the dissolved salts and solids in the water remain behind within the humidifier structure. With time, the salt concentrates and the corrosion effect increase, the reservoir or pan of the humidifier filling with the salt, resulting in the plugging of moving parts and generally causing an unsightly condition. Evaporation plates or porous mats become impervious to the movement of water by osmosis and the evaporation gradually decreases and eventually substantially stops. In humidifiers that operate by direct method of spray generation, the lime or salt does not accumulate within the humidifier itself. However, with the direct method of spray generation, fine, white to gray powder is carried out to settle on surfaces of the dwelling unless the resultant vapor is filtered. If a filtering means or structure is employed to remove the salt, then that structure is subject to corrosion.

In order to eliminate salt mist and build-up of salt in direct and indirect humidifiers respectively, it is necessary to employ distilled water or demineralized water. Partial remedies, which are not wholly satisfactory, include periodically dumping the pan contents, frequent changing of the evaporation plates or mats, and bleeding of the high salt content water to sewers.

Console type humidifiers which are commonly enclosed in a decorative cabinet operate on the indirect air-washer principle and obtain contact between air and water by either breaking the water into fine droplets or passing air over continuously wetted surfaces, e.g., porous mat surfaces. The first method is generally unsatisfactory because of the build-up of lime powder within the console humidifier. The second practice is plagued by liming of the porous mat surfaces, accompanied by gradual decrease of evaporation. In addition, in a console type humidifier water must be piped to the device or replenished periodically by manually carrying buckets of water to the humidifier. If water supply pipes are used, good plumbing practices and safety require that an overflow to the sewer be provided. Console type humidifiers, especially in the smaller residences, compete for space with furniture, television, and the like. In some locations, the cold damp breeze discharged by the console humidifier damages draperies and wallpaper. Some people find it objectionable to have a humidifier located in the primary living area of the home as the kitchen and living room. The console type humidifier when located in the living area, because of the fan or blowers employed therein, interferes with conversation and television and radio listening and adds to background noise.

It is a principal object of this invention to provide a humidifier which is free of problems of liming and corrosion.

It is a further object of the invention to provide a humidifier which in its preferred form requires no additional plumbing.

It is another object of the invention to provide a humidification system wherein all salts and solids are continuously disposed of without valves or controls.

It is a further object of the invention to provide a system wherein there is no waste of water as in conventional systems where salt-laden water is passed to sewage and serves no useful purpose.

It is a still further object of the invention to provide a humidifier which is not located on a furnace or heater and is independent of the heating system and, hence, may be used in dwellings not having a hot air heating system.

It is a still further object of the invention to provide a humidifying device which does not compete for space within the normal living area of the dwelling in which it is being used.

It is a still further object to provide a humidifying system which, because it is located away from the living space, adds little or nothing to the noise level of that area.

It is another object of the invention to provide a humidifier wherein the moist air is initially exhausted into a space wherein the likelihood of damage is minimized.

It is a still further object of the invention to provide a humidifying system for an entire dwelling which can be controlled and maintained at a desired humidity.

The humidifier device of the invention is adapted for use with a tank of a water closet, or toilet as more commonly termed, located in a washroom or bathroom and away generally from the living area of a dwelling. The device of the invention is designed to take water from the tank of the water closet and return excess water to the sewer by way of the water closet tank. The location of the humidifier device in a bathroom or washroom obviates many of the objections commonly found with the console type humidifier located in the living area of a dwelling.

In accordance with Dalton's law of partial pressure, moisture in the form of vapor released in one part of a confined area will distribute itself equally throughout that area. This law assures that if there is molecular movement of air throughout the house, the amount of water vapor associated with a pound of air will be the same everywhere and this will be true regardless of temperature. Hence, if the door to the washroom be kept at least partially open or other opening be provided, the humidity of the rest of the house will become that of the washroom. If no moistened air is being exhausted by the humidifier at its location, i.e., the humidifier is off, the humidity of the room where the humidifier is located will in time be the same as the humidity of the remainder of the dwelling. If the humidity as sensed by a humidistat strays from the desired setting, the humidistat will actuate the humidifier into operation.

When the humidifier of the invention is operating and evaporating water into the air, closing of the door to the room in which the device is located will restrict the humidifying system to that room and in seconds the humidity will rise to the setting of the humidistat control which will then inactivate or stop operation of the humidifier.

When the door of the room is open, if the remainder of the dwelling has a lower humidity than the room in which the humidifier of the invention is located, that room will quickly equalize to the lower humidity and the humidistat sensing the lower humidity will turn on or activate the humidifier and once again the humidifier will operate until the humidity of the entire dwelling reaches the desired humidity setting.

The humidifier of the invention is preferably used with a water closet having an upright water tank from which the top cover is removed. The structure of the humidifier is sized to rest on the open-top water tank. However, the humidifier need not rest directly on the water tank of the water closet but may be located nearby to draw water from the tank for the operation of the humidifier and for returning excess water to the sewer by way of the water closet tank.

Broadly speaking, the humidifier of the invention, which is designed for use with the tank of a water closet, comprises an enclosure having an air-permeable, water-wettable porous mat for at least a portion of its enclosure and means for supplying water to the mat, which water is taken from the tank of the water closet. Means is provided for drawing air through the water-wetted mat, together with means for discharging the water draining from the mat into the tank of the water closet.

In a preferred embodiment of the humidifier of the invention which is adapted for use with a water closet having an upright water tank with its top cover removed therefrom, there is provided a structure which is generally rectangular in plan and sized to rest on the open-top water tank. The structure has porous, water-wettable mats, preferably for all four of its vertical sides and is provided with a top closure having an air discharge opening. The mats may be a single continuous structure encompassing the four sides of the structure. Means is provided for supplying water from the tank of the water closet to upper portions of the mats to wet the mats under gravity flow. The supply means will include a pump submerged in the water of a tank and conduit means leading from the outlet of the pump to the upper portions of the mats. Conveniently, the water is supplied to the upper ends of the several mats via a perforated trough which encircles the four sides of the structure. The humidifier includes means for drawing air inwardly through the water-wetted mats into the interior of the humidifier structure and discharging conditioned (moistened) air outwardly through an air discharge opening which is normally located in a horizontally disposed top closure of the structure. The means for discharging the conditioned air in one embodiment includes a tubular member, vertically disposed with its upper end opening into the aforementioned air discharge opening of the top closure and a fan located to exhaust air from the interior of the humidifier structure into the tubular member leading to the air discharge opening. If desired, a heating means such as a cal rod or other suitable device may be located within the tubular opening for heating the air exhausted by the fan. The heating means need not necessarily be located within the vertical tubular member but may be located elsewhere within the interior of the humidifier.

It will be appreciated that the humidifier of the invention in being used in conjunction with the water tank of a water closet will be essentially free of problems of liming and corrosion because with each flushing of the water closet, the tank is drained of its water and refilled with fresh water. This contrasts with the conventional dwelling humidifier where there is a repeated recirculation of the same batch of water and an inevitable buildup of the salt content, leading to corrosion and inefficient operation. The humidifier of the invention when it is used in its preferred location, that is, located atop an upright water tank of a water closet, requires no additional plumbing and the salts and solids are continuously disposed of without valves or controls as required in some conventional systems. There is no waste of water as occurs when salt-laden water is passed to sewage, as the water draining from the porous mats of the humidifier of the invention is returned to the water closet tank where it may be employed as a portion of the flush water. The humidifier of the invention since it does not depend upon the presence of a furnace or heater as required in some systems, may be used in dwellings not having a hot air heating system. The humidifier of the invention in being used in a bathroom or washroom does not compete for space within the normal living area of the dwelling and adds little or nothing to the noise level of that area. The humidifier of the invention in being designed to be used in a bathroom or washroom is in a location where the structure and furnishings are designed to withstand a substantial degree of moisture without deterioration.

These and other objects and advantages of the humidifier of the invention will become more apparent in view of the following specification and drawings, wherein.

Figure 1:
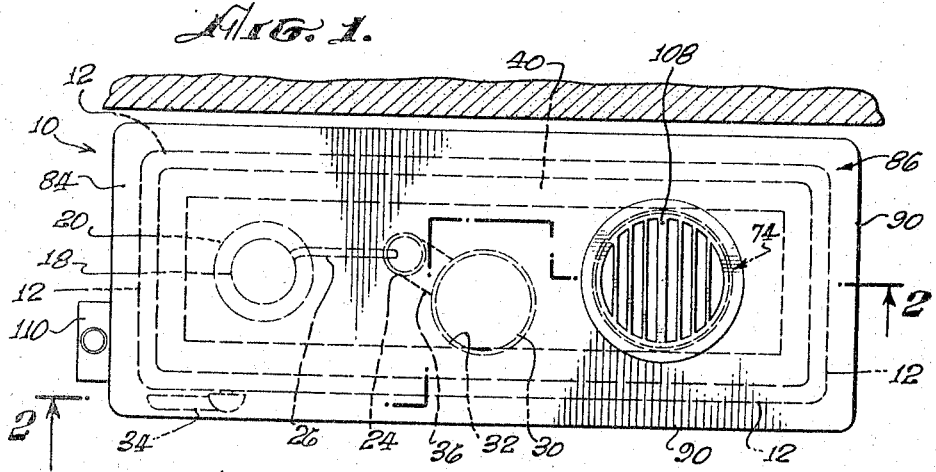
FIG. 1 is a top plan view of one embodiment of the humidifier of the invention positioned atop an upright water tank of a water closet with the top cover of the tank having been removed.
Figure 2:
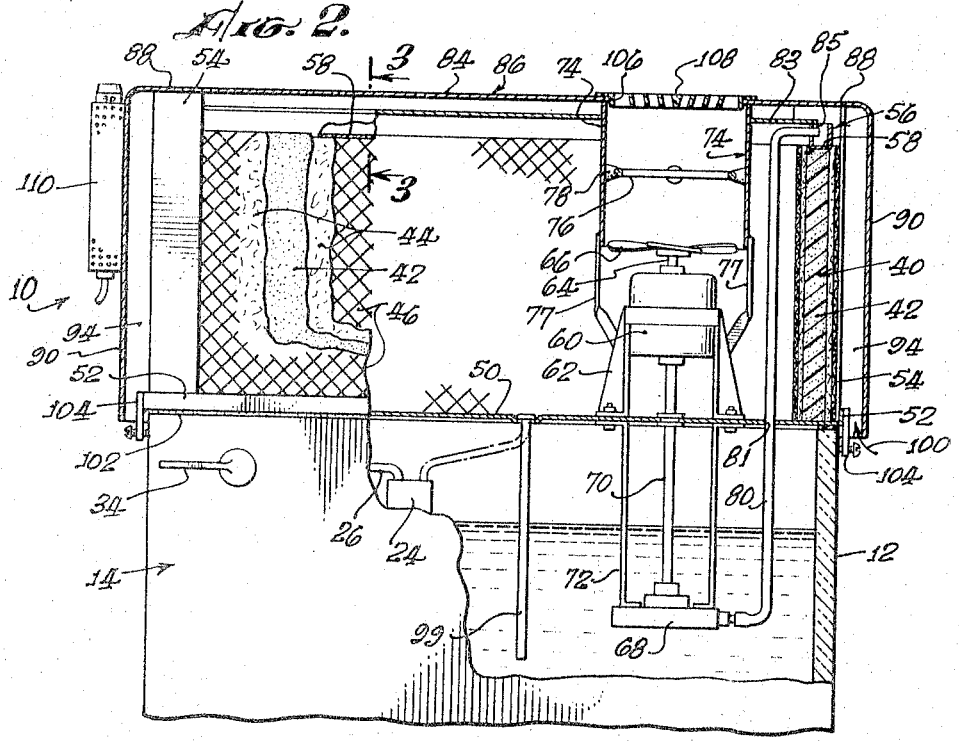
FIG. 2 is a longitudinal sectional view, partly in elevation, taken along irregular line 2—2 of FIG. 1.

Referring to FIGS. 1 and 2, there is illustrated one form of humidifier 10 of the invention resting on the upper edges of the four walls 12 of a typical upright, rectangular water tank 14 of a conventional toilet or water closet, the top cover having been removed from the tank 14. For illustration purposes, the particular water closet illustrated is of the type having a vertical float control valve 18 supporting a movable annular float member 20, a vertical overflow pipe 24, an overflow tube 26 leading from the valve 18 and emptying into the overflow pipe 24, and a typical tank ball 30 closing off a water drainage hole 32 located at the bottom of the tank 14. The tank ball 30 is lifted through a linkage that is manipulated by a handle 34 located adjacent the outside top of the tank 14. With elevation of the tank ball 30, the water in the tank rushes out through the drainage hole 32 into the toilet bowl therebelow. The overflow pipe 24 at its lower end is connected to a line 36 which empties into the toilet bowl below the drainage hole 32 and tank ball 30. It will be appreciated that the humidifier of the invention may be used with other types of tank mechanisms and is not limited to the one shown for illustrative purposes.

The particular humidifier of the invention illustrated is box-shaped, is rectangular in plan, and is sized to rest on the upper edges of the walls 12 of the tank 14. The humidifier structure has for its four vertical sides porous, air-permeable, water-wettable mats 40 made up, preferably, of an open structure, flexible, polyurethane sheet 42 which has held thereto on its opposite sides wood pulp floccings 44 with open metal grills 46 supporting the flexible mats on either side thereof. Preferably, the mats 40 of the four sides comprises a single sheet of the polyurethane.

The humidifier structure at its bottom is closed by a pan 50 which has an upturned flange for its sides 52. The pan at its four corners has welded to the inner faces of the pan sides 52 upright L-shaped corner members 54, which serve to hold the grills 46 in position.

Figures 3, 4:
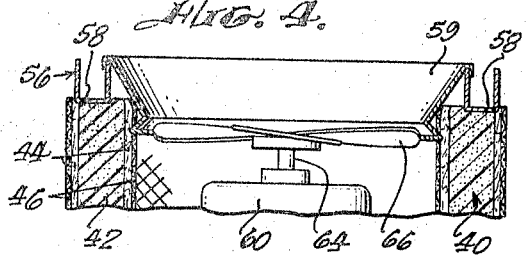
FIG. 3 is a fragmentary sectional view of a trough seated in an upper edge of a water-wettable mat of the humidifier of FIG. 1.
FIG. 4 is a fragmentary vertical sectional view of another embodiment of the humidifier of the invention taken generally from the site of line 4—4 of FIG. 1.

A four-sided, rectangular trough 56 rests directly upon the porous mats 40. The trough 56 is provided with a plurality of holes 58 through which water trickles downwardly over the mats 40. It will be noted that the trough 56, as best seen in FIG. 3, is located somewhat closer to the outside face of the porous mat 40 and that the outlet holes 58 of the trough are located adjacent the outside bottom of the trough. This arrangement of the holes 58 assures that with the inward movement of the air, substantially the whole thickness of the mat 40 will be wetted by the water. The trough 56 (see FIG. 3) depresses the upper end of the mat 40 and in this manner forms a very effective seal.

Within the interior of the humidifier structure, a motor 60 is supported by braces 62 extending upwardly from the pan 50 with the axis of rotation of the motor being perpendicular to the bottom of the pan. The motor 60 is provided with a drive shaft 64 which extends from its opposite two faces and at its upper end supports a fan or propeller 66 and which at its other and lower end drives an impeller-type pump 68 which is submerged in the water of the tank 14. The lower portion of the drive shaft 64 is enclosed in a tube 70. It will be seen that the submerged pump 68 is supported from the underside of the pan 50 by several braces 72.

The fan 66 is located in the embodiment of FIG. 2 at the lower end of a vertically disposed shroud or tubular member 74 which is supported from the motor-supporting braces 62 by several, spaced, upright bracing members 77. There is located within the tubular member 74 centrally of its length a heating member in the form of an annular cal rod 76 which is supported from the interior wall of the tubular member 74 by several insulators 78.

The outlet of the submerged impeller pump 68 opens into a pipe or conduit 80 which extends vertically up through a hole in the pan 50 and which at its upper end empties into the aforementioned trough 56 which encircles the four sides of the structure and overlies the mats 40. Preferably, the conduit 80 above the pan 50 is branched to provide two spaced lines emptying into the trough 56.

The interior of the humidifier 10 of the invention defined by the porous mats 40 is enclosed by a flat enclosure plate 83 which around its perimeter has a downwardly turned lip 85 (FIG. 3) which snugly engages the inner vertical edge of the trough 56. A shell 84 which includes a horizontally-disposed, rectangular top closure 86 rests on the upper ends 88 of the corner members 54 with the side skirt members 90 integrally formed with and depending from the four edges of the top closure 86. It will be noted that the skirt members 90 of the shell are spaced outwardly a short distance from the porous mats 40 and outwardly of the upper end of the walls 12 of the tank 14 to define an air space or chamber 94 from which air is drawn in by the fan 66 inwardly through the wetted mats 40. The air enters the air chamber 94 at the lower end thereof as indicated by the arrow 100.

The humidifier is held on top of the tank 14 by clamps 104 with the underside of the pan 50 resting on a gasket 102 which extends around the top edge of the walls 12 of the tank 14. The gasket 102 absorbs vibration and minimizes sound.

It will be noted that the top closure 86 of the shell 84 has a circular air discharge opening 106 which is provided with a grill 108. The air discharge opening 106 is in alignment with the tubular member 74.

Water draining from the mats 40 collects in the pan 50 and is returned to the water tank 14 therebelow by a tube 99 which extends through an opening in the bottom of the pan. The tube 99 may discharge the water directly to the sewer, as indicated in phantom lines, via the overflow pipe 24 but will usually empty beneath the surface of the water of the tank 14 as indicated in full lines.

In the particular embodiment illustrated, the humidifier has a humidistat 110 which is attached to the skirt of the shell 84. The humidistat 110 could be located elsewhere but is conveniently placed directly on the humidifier 10. The preferred humidstat 110 employs human hair as the contracting element. The circuit to the motor 60 and heating element 76 is opened and closed in accordance with the setting of the humidistat which operates as explained hereinbefore to regulate the humidity of the dwelling.

Another embodiment generally resembling that of FIG. 2 is illustrated in FIG. 4, and differs principally in the location of the fan 60 which is elevated from the location of FIG. 2 and is positioned immediately below the main portion of the top enclosure plate 83 in a shallow orifice member 59.

Although exemplary embodiments of the invention have been disclosed and discussed, it will be understood that other applications of the invention are possible and that the embodiments disclosed may be subjected to various changes, modifications and substitutions without necessarily departing from the spirit of the invention as defined by the claims which follow.

I claim:

1. In a humidifier for use in a dwelling, the combination comprising:
    a water closet having a tank and means permitting periodic emptying of the tank;
    an enclosure having an air-permeable porous mat for at least a part of its walls;
    means for supplying water from the tank to the mat to wet said mat;
    means for drawing air through the water-wetted mat; and
    means for discharging water draining from the mat into the water of the tank of the water closet.

2. In a humidifier for use in a dwelling, the combination comprising:
    a water closet having a tank and means permitting periodic emptying of the tank;
    an enclosure having an air-permeable porous mat for at least a part of its walls;
    means for supplying water from the tank to an upper portion of the mat to wet said mat under gravity flow;
    means for drawing air through the water-wetted mat; and
    means for collecting the water draining from the mat and discharging the collected water into the water of the tank of the water closet.

3. In a humidifier for use in a dwelling, the combination comprising:
    a water closet having a tank and means permitting periodic emptying of the tank;
    an enclosure having for at least a part of its sides an air-permeable, water-wettable, porous mat and having an air discharge passage therein;
    means for supplying water from the tank to an upper portion of the mat to wet said mat under gravity flow;
    a humidistat control for regulating the operation of the humidifier;
    means responsive to the humidistat for drawing air inwardly through the water-wetted mat into the enclosure and for discharging said air outwardly through said air discharge passage; and
    means for discharging the water draining from the mat into the water of the tank of the water closet.

4. In a humidifier for use in a dwelling, the combination comprising:
    a water closet having a tank and means permitting periodic emptying of the tank;
    an enclosure having an air-permeable, water-wettable, porous mat for at least a portion of its vertical sides and having an air discharge passage therein;
    means for supplying water from the tank of the water closet to an upper portion of the mat to wet said mat under gravity flow;
    means for drawing air inwardly through the water-wetted mat and discharging said air outwardly through the air discharge opening in the enclosure; and
    means for returning the water draining from the mat into the water of the tank of the water closet.

5. A humidifier in accordance with claim 4 wherein there is provided within the enclosure means for heating the air leaving the humidifier through the air discharge passage of said enclosure.

6. In a humidifier for use in a dwelling, the combination comprising:
    a water closet having a tank and means permitting periodic emptying of the tank;

an enclosure having air-permeable, water-wettable, porous mats for at least a portion of its vertical sides with an air discharge passage located in said enclosure;

means for supplying water from the tank of the water closet to upper portions of the respective mats to wet said mats under gravity flow, said means including a pump submerged in the water of said tank and conduit means leading from the outlet of said pump to the upper portion of the mats;

means for drawing air inwardly through the water-wetted mats into the enclosure and discharging said air through the air discharge passage in the enclosure; and means for collecting the water draining from the mats and returning the collected water to the water of the tank of the water closet.

7. A humidifier in accordance with claim 6 wherein there is provided within the enclosure means for heating the air leaving the humidifier through the air discharge passage of said enclosure.

8. A humidifier for use in a dwelling, said humidifier comprising:

a water closet having an upright water tank with its top cover removed and having means permitting periodic emptying of the tank;

a structure sized to rest on the open-top water tank and having for at least a portion of its vertical sides air porous, water-wettable mats and a top closure provided with an air discharge opening;

means for suppying water from the tank of the water closet to upper portions of the mats to wet said mats under gravity flow;

means for drawing air inwardly through the water-wetted mats into the humidifier structure and discharging said air outwardly through the air discharge opening in the top closure of said structure; and means for returning the water draining from the mats into the water of the tank of the water closet.

9. A humidifier in accordance with claim 8 wherein there is provided within the enclosure means for heating the air leaving the humidifier through the air discharge passage of said enclosure.

10. A humidifier for use in a dwelling, said humidifier comprising:

a water closet having an upright water tank with its top cover removed and having means permitting periodic emptying of the tank;

a box-like structure sized to rest on the open-top water tank and having porous, water-wettable mats for its vertical sides and a top closure provided with an air discharge opening;

means for supplying water from the tank of the water closet to upper portions of the mats to wet said mats under gravity flow, said means including a pump submerged in the water of said tank and conduit means leading from the outlet of said pump to the upper portions of the mats;

means for drawing air inwardly through the water-wetted mats into the interior of the humidifier structure and discharging said air outwardly through the air discharge opening located in the top closure of said structure, said means including a tubular member opening at one end into said air discharge opening and a fan located at the other end of said tubular member and disposed to discharge air from the interior of the humidifier structure into the tubular member; and means for returning the water draining from the mats into the water of the tank of the water closet.

11. A humidifier for use with a water closet having an upright water tank with its top cover removed therefrom, said humidifier comprising:

a box-like structure sized to rest on the open-top water tank and having porous, water-wettable mats for its vertical sides, a top closure provided with an air discharge opening, and skirt side members spaced outwardly of the mats;

means for supplying water from the tank of the water closet to the upper portions of the mats to wet said mats under gravity flow, said means including a pump submerged in the water of said tank and conduit means leading from the outlet of said pump to the upper portions of the mats;

means for drawing air inwardly through the water-wetted mats into the humidifier structure and discharging said air outwardly through the air discharge opening located in the top closure of said structure, said means including a tubular member opening at one end into said air discharge opening and a fan located at the other end of said tubular member and disposed to discharge air from the interior of the humidifier structure into the tubular member;

means for returning the water draining from the mats into the tank of the water closet; and a heating means located within the tubular member for heating the air exhausted by said fan.

12. A humidifier for use with a water closet having an upright water tank with its top cover removed, said humidifier comprising:

a structure sized to rest on the open-top water tank and having for at least a portion of its vertical sides air porous, water-wettable mats, a top closure provided with an air discharge opening, and skirt side members spaced outwardly of the mats;

a pump supported by said structure and submerged within the water of the tank of the water closet and conduit means leading from the outlet of said pump to the upper portions of the mats;

means for drawing air inwardly through the water-wetted mats into the humidifier structure and discharging said air outwardly through the air discharge opening in the top closure of said structure, said means including a vertically disposed tubular member opening at its upper end into said air discharge opening of the top closure and a fan located at the lower end of said tubular member and disposed to exhaust air from the interior of the humidifier structure into the tubular member;

said fan being generally located directly over the submerged water pump with a motor supported by the humidifier structure located therebetween and serving to power both the pump and the fan; and means for collecting the water draining from the mats and returning the collected water to the tank of the water closet.

13. A humidifier in accordance with claim 12 wherein there is located a heating means within the vertical tubular member for heating the air exhausted by the fan.

14. A humidifier for use with a water closet having an upright tank with its top cover removed, said humidifier comprising:

a structure sized to rest on the open-top water tank and having for at least a portion of its vertical sides air porous, water-wettable mats and a top closure provided with an air discharge opening, said structure being provided with a bottom which closes off the interior of the structure from the water tank;

means for supplying water from the tank of the water closet to the upper ends of the vertically disposed porous mats, said means including a pump supported by the humidifier structure and submerged in the water of the tank and conduit means leading from the outlet of said submerged pump through the bottom of the humidifier structure to a trough overlying the upper ends of the porous mats, said trough being provided with a plurality of holes to permit water to flow therefrom down and over the respective mats; means for drawing air inwardly through the water-wetted mats into the interior of the humidifier structure and discharging said air outwardly through the air discharge opening in the top closure of said structure, said means including a vertically disposed tubular member opening at its upper end into said air discharge opening and a fan located at the lower end of said tubular member and disposed to exhaust air from the interior of the humidifier structure into the tubular member; and means for collecting the water draining from the mats onto the upper surface of the bottom of the humidifier structure and returning the collected water to the tank of the water closet.

15. A humidifier in accordance with claim 14 wherein the means for collecting and returning the drainage water from the mats to the tank of the water closet comprises a downwardly extending tube which at its upper end opens into the interior of the humidifier structure through a hole in the bottom thereof.

References Cited by the Examiner

UNITED STATES PATENTS

| | | | |
|---|---|---|---|
| 2,319,565 | 5/1943 | Stratton | 261—29 |
| 2,472,383 | 6/1949 | Owens | 55—257 X |
| 2,736,039 | 2/1956 | Majo | 4—227 |
| 2,752,134 | 6/1956 | Paulus | 261—29 |
| 2,769,620 | 11/1956 | Davison | 261—29 X |
| 2,934,022 | 4/1960 | Rodick et al. | 261—29 X |
| 3,179,386 | 4/1965 | Liebmann | 261—29 |
| 3,220,707 | 11/1965 | Weatherston et al. | 261—29 X |

HARRY B. THORNTON, *Primary Examiner.*

RONALD R. WEAVER, *Examiner.*